| United States Patent [19] | [11] | Patent Number: | 4,876,313 |
|---|---|---|---|
| Lorah | [45] | Date of Patent: | Oct. 24, 1989 |

[54] GRAFTED CORE-SHELL POLYMER COMPOSITIONS USING POLYFUNCTIONAL COMPOUNDS

[75] Inventor: Dennis P. Lorah, Lansdale, Pa.

[73] Assignee: Rohm and Haas Company

[21] Appl. No.: 902,264

[22] Filed: Aug. 29, 1986

[51] Int. Cl.$^4$ .................... C08F 265/06; C08F 2/24
[52] U.S. Cl. ......................... 525/281; 525/285;
525/282; 525/287; 525/291; 525/296; 525/297;
525/305; 525/306; 525/307; 525/308; 525/309;
525/312; 525/313; 525/301; 525/902
[58] Field of Search ............... 525/281, 285, 282, 287,
525/291, 296, 297, 305, 306, 307, 308, 301, 309,
312, 313, 222, 223, 224, 225, 226, 227, 228, 229,
69, 902

[56] References Cited

U.S. PATENT DOCUMENTS 3,655,825   4/1972   Souder ........................... 525/210
4,107,120   8/1978   Plamondon .................... 523/201

*Primary Examiner*—Christopher Henderson
*Attorney, Agent, or Firm*—Carl W. Battle

[57] ABSTRACT

Improved core-shell polymers having an alkali-insoluble core and an alkali-soluble shell are prepared by emulsion polymerization of the core-shell polymers utilizing compounds which chemically graft the core and shell together. The core-shell polymers exhibit improved solvent stability, water resistance, heat resistance and rheology. The polymers are useful in application such as inks, coatings and varnishes, floor polishes, leather treatment, cement formulations, and as a seed for further emulsion polymerization.

23 Claims, No Drawings

GRAFTED CORE-SHELL POLYMER COMPOSITIONS USING POLYFUNCTIONAL COMPOUNDS

BACKGROUND OF THE INVENTION

Mixtures or blends of alkali-soluble resins with alkali-insoluble emulsion polymers have been used in inks and floor polishes. The alkali-soluble resins were generally prepared by solution polymerization, such as described in U.S. Pat. No. 3,037,952. Significant improvements in stability, water resistance, rheology, and efficiency were achieved by polymerizing one component in the presence of the other to form core-shell polymers as described in pending U.S. patent application of Albert B. Brown, et al., Ser. No. 872,714, filed June 10, 1986. This one-pot technique of Brown, et al., produced core-shell polymers having a physical interaction between the two polymer phases.

While the core-shell polymers of Brown, et al., represented significant improvements over the mixtures or blends of the prior art, further improvements in stability were desired. Specifically the use of certain additives, especially those containing organic solvent, caused the prior art blends and the core-shell polymer compositions of Brown, et al., to become unstable and thus unsuitable for many applications. For example, isopropyl alcohol is added to make inks and overvarnishes in the graphic arts field. Thus stability toward alcohols and other organic solvents is an essential requirement for the neutralized core-shell polymers to be used in this area.

The present invention eliminates the problems associated with solvent instability of prior art blends and core-shell polymer compositions by providing core-shell polymers wherein the core and shell components are chemically grafted together to a significant or substantial extent. The grafted core-shell polymers of this invention remains permanently attached in both aqueous and non-aqueous solvent. Additionally the grafted core-shell polymers offer the advantages of improved rheology, redispersability of the latex core, decreased foaming, less crawling or dewetting during recoating, and greater flexibility during synthesis in the selection of monomers and process additives.

The present invention involves preparation of the grafted core-shell polymers via an aqueous-based emulsion polymerization of both the core and shell. U.S. Pat. Nos. 4,465,803 and 4,565,839 disclose aqueous emulsion compositions prepared by emulsion polymerization of radical-polymerizable monomers in the presence of a water-soluble resin having a graft-polymerizable unsaturated group in the side chain. The '803 and '839 patents are distinguishable from the present invention in several respects. Firstly, the '803 and '839 patents teach initial preparation of the water-soluble resin by *solution* polymerization in organic solvents such as cellosolve-type, carbitol-type, and alcohol-type solvents, followed by emulsion polymerization at a high pH of radical-polymerizable monomers in the presence of the water-solubilized resin. In contrast, applicant's invention involves a completely emulsion polymerization in an aqueous medium at a low pH (i.e., less than 6). Applicant's aqueous emulsion polymerization of the alkali/water-soluble resin gives cost, efficiency and safety advantages over the solution polymerization technique taught in the '803 and '839 patents. The use of organic solvents in solution polymerization presents a safety and environmental hazard due to the flammable and toxic nature of the solvents. Additionally, solution polymerization requires expensive stripping of the solvent from the resin to produce an aqueous-based composition. Secondly, emulsion polymerization according to applicant's invention results in improved efficiency because a higher concentration of resin can be produced in the low pH process. Thus, applicant's emulsion polymerization process can result in a 45–50% by weight resin solids concentrations, whereas the solution polymerization process is typically limited to a resin concentration of about 30–38% because of the greater viscosity.

Thirdly, applicant's emulsion polymerization invention also results in better particle size control and a more narrow particle size distribution than with the solution polymerization process.

Fourthly, applicant's invention utilizes polyfunctional compounds which include unsaturated graft sites and those containing abstractable atoms. These graft sites can be incorporated into either the alkali-insoluble core or the alkali-soluble shell of applicant's core-shell polymers. However, the '803 and '839 patents only disclose unsaturated graft sites in the water-soluble resin component.

Fifthly, applicant's preferred embodiment involves emulsion polymerization of the alkali-insoluble core first, followed by emulsion polymerization of the alkali-soluble shell. This results in a more crosslinked core which can have a greater stability toward alcohol/solvents and other additives than the polymers prepared in the '803 and '839 patents. A crosslinked core can also result in enhanced film properties, such as block resistance.

SUMMARY OF THE INVENTION

This invention relates to improved core-shell polymers having an alkali-insoluble, emulsion polymer core and an alkali-soluble, emulsion polymer shell, wherein the core and shell are chemically grafted together to a significant or substantial extent. The core and shell components are chemically grafted together by carrying out the emulsion polymerization of either the core or shell in the presence of at least one polyfunctional compound having (1) two or more sites of unsaturation, (2) two or more abstractable atoms, or (3) a combination of one or more sites of unsaturation and one or more abstractable atoms. The core-shell polymers of this invention result in polymer compositions having improved stability toward additives (i.e., alcohols, solvents, etc.), redispersibility, foam control, heat resistance and rheology.

Preferably, following Technique No. 1, the core-shell polymers are prepared by first emulsion polymerization of the alkali-insoluble core in the presence of the polyfunctional compound, followed by the subsequent emulsion polymerization of the shell in the presence of the previously-prepared core. The weight ratio of the core to the shell preferably is about 85:15 to 15:85, with the core having a weight average molecular weight of greater than about 8,000 and the shell having a wt. avg. mol. wt. of about 5,000 to about 100,000 as determined by gel permeation chromatography. The polyfunctional compound preferably has at least two sites of unsaturation of unequal reactivity.

The core and shell are polymerized from monomers selected from methyl acrylate, ethyl acrylate, butyl acrylate, 2-ethylhexyl acrylate, decyl acrylate, methyl methacrylate, ethyl methacrylate, hydroxyethyl methacrylate, butyl methacrylate, acrylonitrile, acylic acid, methacrylic acid, itaconic acid, maleic acid, fumaric acid, acrylic anhydride, methacrylic anhydride, maleic anhydride, itaconic anhydride, fumaric anhydride, styrene, substituted styrene, vinyl acetate, and other $C_1$ to $C_{12}$ alkyl acrylates and methacrylates.

The polyfunctional compounds are selected from the group consisting of allyl-, methallyl-, vinyl-, and crotyl-esters of acrylic, methacrylic, maleic (mono- and di-esters), fumaric (mono- and di-esters) and itaconic (mono- and di-esters) acids; allyl-, methallyl-, and crotyl-vinyl ether and thioether; N- and N,N-di-allyl-, methallyl-, crotyl-, and vinyl-amides of acrylic and methacrylic acids; N-allyl-, methallyl-, and crotyl-maleimide; vinyl esters of 3-butenoic and 4-pentenoic acids; diallyl phthalate; triallyl cyanurate; O-allyl-, methallyl-crotyl-, O-alkyl-, aryl-, P-vinyl-P-allyl-, P-crotyl-, and P-methallyl-phosphonates; triallyl-, trimethallyl-, and tricrotyl-phosphates; O-vinyl-, O,O-diallyl-, dimethallyl-, and dicrotyl-phosphates; cycloalkenyl esters of acrylic, methacrylic, maleic (mono- and di-esters), fumaric (mono- and di-esters), and itaconic (mono- and di-esters) acids; vinyl ethers and vinyl thioethers of cycloalkenols and cycloalkene thiols; vinyl esters of cycloalkene carboxylic acids; 1,3-butadiene, isoprene and other conjugated dienes; paramethylstyrene; chloromethylstyrene; allyl-, methallyl-, vinyl-, and crotyl-mercaptan; bromotrichloromethane; bromoform; carbon tetrachloride; and carbon tetrabromide.

Following Technique No. 2, the invention may be carried out by adding the polyfunctional compound after the emulsion polymerization of the core, allowing the polyfunctional compound to soak into the core and polymerizing it, and subsequently emulsion polymerizing the shell. This technique uses the same monomers for the core and shell and most of the same polyfunctional compounds as used in Technique No. 1 above. Additionally, the polyfunctional compound can be selected from ethyleneglycol dimethacrylate, diethyleneglycol dimethacrylate, triethyleneglycol dimethacrylate, polyethylene glycol dimethacrylate, polypropyleneglycol dimethacrylate, neopentylglycol dimethacrylate, 1,3-butyleneglycol diacrylate, neopentylglycol diacrylate, trimethylolethane trimethacrylate, dipentaerythritol triacrylate, dipentaerythritol tetracylate, dipentaerythritol pentaacrylate, 1,3-butylene glycol dimethacrylate, trimethylolpropane trimethacrylate, trimethylol propane triacrylate, tripropylene glycol diacrylate, and divinyl benzene.

Following Technique No. 3, the invention may also be carried out by first emulsion polymerizing of the shell in the presence of the polyfunctional compound, followed by emulsion polymerization of the core. Following this technique, the same monomers for the core and shell given above can be used. The polyfunctional compounds useful for this technique are those given above for Technique No. 1.

DETAILED DESCRIPTION

By utilizing polyfunctional compounds capable of chemically grafting the core and shell components together, improved core-shell polymers can be prepared. The core-shell polymers have an alkali-insoluble, emulsion polymer core and an alkali-soluble, emulsion polymer shell wherein the core and shell are chemically grafted together to a significant or substantial extent such that the core and shell are permanently attached.

This invention relates to compositions comprising the grafted core-shell polymers and their use in a variety of applications.

The compositions of the invention comprise the grafted core-shell polymers such that, upon dissolving the shell with alkali, a significant portion of the shell remains permanently attached the core. It is this permanent attachment of the shell and core through chemical grafting which is believed to give the core-shell polymers of this invention their improved stability toward alcohols/solvents and other additives.

There are three related techniques for preparing the grafted core-shell polymers of this invention. They are: (1) emulsion polymerization of the alkali-insoluble core in the presence of the polyfunctional compound(s), followed by emulsion polymerization of the alkali-soluble shell; (2) emulsion polymerization of the core, addition and polymerization of the polyfunctional compound(s), followed by emulsion polymerization of the shell; and (3) emulsion polymerization of the shell in the presence of the polyfunctional compound(s), followed by emulsion polymerization of the core.

Suitable monomers for the core and shell polymers are methyl acrylate, ethyl acrylate, butyl acrylate, 2-ethylhexyl acrylate, decyl acrylate, methyl methacrylate, ethyl methacrylate, hydroxyethyl methacrylate, butyl methacrylate, acrylic acid, methacrylic acid, itaconic acid, maleic acid, fumaric acid, acrylic anhydride, methacrylic anhydride, maleic anhydride, itaconic anhydride, fumaric anhydride, styrene, substituted styrene, acrylonitrile, vinyl acetate, other $C_1$ to $C_{12}$ alkyl acrylates and methacrylates, and the like.

The weight ratio of the core polymer to the shell polymer is preferably about 85:15 to about 15:85, more preferably about 70:30 to about 30:70, and most preferably about 60:40 to about 40:60. Preferably the core polymer has a weight average molecular weight greater than about 8,000 and the shell polymer has a weight average molecular weight of about 5,000 to about 100,000 as determined by gel permeation chromatography. Preferably the glass transition temperature (Tg) of the core polymer is about $-65°$ C. to about 100° C. and the Tg of the shell is greater than about 100° C.

The polyfunctional compounds useful in chemically grafting the core and shell together are selected from (a) polyfunctional compounds having two or more sites of unsaturation, (b) reactive chain transfer agents having two or more abstractable atoms, and (c) hybrid polyfunctional compounds having one or more sites of unsaturation and one or more abstractable atoms. Compounds such as the glycidyl-containing vinyl monomers and vinyl isocyanates and the like, described in U.S. Pat. No. 4,565,839, are not suitable as polyfunctional compounds for this invention because they do not work to graft the core to the shell in aqueous-based emulsion polymerizations.

The preferred technique for making the improved core-shell polymers of this invention is Technique No. 1 above where the polyfunctional compound(s) is present during the emulsion polymerization of the core, followed by emulsion polymerization and grafting of the shell to the core. This technique can result in a core polymer which has been substantially crosslinked by the polyfunctional compound and which has greater stability toward alcohols, organic solvents and other additives. The polyfunctional compound(s) reacts with the core polymer to crosslink it and has reactive functionality remaining for grafting to the shell polymer.

Suitable monomers for the core following Technique No. 1 include all the common emulsion polymerizable monomers given above. Preferred monomers for the core include the $C_1$ to $C_{12}$ alkyl acrylates and methacrylates and styrene. The core may optionally contain common chain transfer agents such as or $C_1$ to $C_{12}$ alkyl mercaptans or halogenated hydrocarbons at levels of about 0.1 to about 10% by weight. Suitable levels of acid containing monomers in the core range from 0 to about 10% by weight, preferably about 0.5 to about 5%.

The polyfunctional compounds useful in Technique No. 1 should preferably be of the type commonly referred to as graft-linking monomers having two or more sites of unsaturation of unequal reactivity. Additionally, graft-linking monomers with readily abstractable atoms and functional chain transfer agents are also suitable for use in Technique No. 1. More preferably the polyfunctional compound(s) useful in Technique No. 1 are selected from the group consisting of allyl-, methallyl-, vinyl-, and crotyl-esters of acrylic, methacrylic, maleic (mono- and di-esters), fumaric (mono- and di-esters) and itaconic (mono- and di-esters) acids; allyl-, methallyl-, and crotyl-vinyl ether and thioether; N- and N, N-di-allyl-, crotyl-, methallyl-, and vinyl-amides of acrylic and methacrylic acid; N-allyl-, methallyl-, and crotyl-maleimide; vinyl esters of 3-butenoic and 4-pentenoic acids; diallyl phthalate; triallyl cyanurate; O-allyl, methallyl-, crotyl-, O-alkyl-, aryl-, P-vinyl-, P-allyl, P-crotyl-, and P-methallyl-phosphonates; triallyl-, trimethallyl-, and tricrotyl-phosphates; O,O-diallyl-, dimethallyl-, and dicrotyl-phosphates; cycloalkenyl esters of acrylic, methacrylic maleic (mono- and di-esters), fumaric (mono- and di-esters), and itaconic (mono- and di-esters) acids; vinyl ethers and thioethers cycloalkenols and cycloalkene thiols; vinyl esters of cycloalkene carboxylic acids; 1,3-butadiene, isoprene, and other conjugated dienes; paramethylstyrene; chloromethylstyrene; allyl-, methallyl-, vinyl-, and crotyl-mercaptan; bromotrichloromethane; bromoform; carbon tetrachloride; and carbon tetrabromide. Preferably the level of said polyfunctional compound(s) ranges from about 0.1 to about 30% by weight of the core, more preferably about 1.0 to about 10%. Most preferably the polyfunctional compound is allyl acrylate or allyl methacrylate.

Suitable monomers for use in preparing the shell monomer following Technique No. 1 include those listed above for the core. Higher levels of acid-containing monomers are used in the shell than in the core to induce alkali solubility. Suitable levels of acid-containing monomer(s) for the shell range from about 10 to about 60% by weight, preferably about 20 to about 50% by weight. The most preferred acid-containing monomers for use in preparing the core polymer is methacrylic acid. Anhydrides, such as methacrylic anhydride, maleic anhydride, itaconic anhydride and the like, may be used in place of the acid-containing monomers in the shell polymer. Preferably the shell polymer comprises about 40 to about 90% by weight methyl methacrylate. The shell polymer preferably has a weight average molecular weight of about 5,000 to about 100,000 as determined by gel permeation chromatography. Common chain transfer agents or mixtures thereof known in the art, such as alkylmercaptans, are employed to control molecular weight.

This emulsion polymerization of the core and shell polymer can basically be carried out by processes which are well known in the art. Processes for emulsion polymerization are described in pending U.S. patent application of Albert B. Brown, et al., Ser. No. 872,714, filed June 10, 1986 and U.S. Pat. No. 4,443,585, the disclosures of which are herein incorporated by reference. By emulsion polymerizing the core and shell polymers in aqueous medium advantages such as safety, efficiency, and better particle size control are obtained over solvent-based solution polymerization processes.

Based on equivalents of acid in the shell polymer, preferably about 0.8 to about 1.5 equivalents of base are added to the polymer compositions to neutralize and substantially, but not totally, dissolve the shell polymer so as to form a blend of neutralized core-shell polymer and an aqueous solution of neutralized shell polymer. This method leaves some of the shell polymer permanently attached to the core. The base suitable for use in this invention can be any kind, but is preferably selected from the group consisting of ammonia, triethylamine, monoethanolamine, dimethylaminoethanol, sodium hydroxide and potassium hydroxide.

Technique No. 2 for preparing the core-shell polymers of this invention involves addition of the polyfunctional compound(s) to the preformed core polymer emulsion. The core polymer is first emulsion polymerized using monomers and concentrations described above for Technique No. 1. After the core polymer emulsion has been prepared, the polyfunctional compound(s) is added, allowed to soak into the core polymer for about 10 to about 60 minutes, and polymerized using a redox initiator such as t-butyl hydroperoxide/sodium sulfoxylate formaldehyde/ferrous sulfate. Subsequently the shell polymer is emulsion polymerized in the presence of the core and chemically grafted thereto. Monomers and concentrations suitable for preparing the shell polymer following Technique No. 2 are the same as those described above for Technique No. 1.

Polyfunctional compounds suitable for use following Technique No. 2 are selected from the group consisting of allyl-, methallyl-, vinyl-, and crotyl-esters of acrylic, methacrylilc, maleic (mono- and di-esters) fumaric (mono- and di-esters), and itaconic (mono- and di-esters) acids; allyl-, methallyl-, and crotyl-vinyl ether and thioether; N- and N,N-di-allyl-, crotyl-, methallyl-, and vinyl-amides of acrylic and methacrylic acid; N-allyl-, methallyl-, and crotyl-maleimide; vinyl esters of 3-butenoic and 4-pentenoic acids; diallyl phthalate; triallyl cyanurate; O-allyl, methallyl-, crotyl-, O-allyl-, aryl-, P-vinyl-, P-allyl, P-crotyl-, and P-methallyl-phosphonates; triallyl-, trimethallyl-, and tricrotyl-phosphates; cycloalkenyl esters of acrylic, methacrylic, maleic (mono- and di-esters), fumaric (mono- and di-esters), and itaconic (mono- and di-esters) acids; vinyl ethers and thioethers of cycloalkenols and cycloalkene thiols; vinyl esters of cycloalkene carboxylic acids; and 1,3-butadiene, isoprene, and other conjugated dienes. In addition, compounds of the type commonly described as crosslinking polyunsaturated monomers having two or more sites of unsaturation of approximately equal reactivity can be used, such as, for example ethyleneglycol dimethacrylate, diethyleneglycol dimethacrylate, triethyleneglycol dimethacrylate, polyethylene glycol dimethacrylate, polypropyleneglycol dimethacrylate, neopentylglycol dimethacrylate, 1,3-butyleneglycol diacrylate, neopentylglycol diacrylate, trimethylolethane trimethacrylate, dipentaerythritol triacrylate, dipentaerythritol tetracrylate, dipentaerthritol pentaacrylate, 1,3-butylene glycol dimethacrylate, trimethylolpropane trimethacrylate, trimethylol propane triacrylate, tripropylene glycol diacrylate, and divinyl benzene.

The level of polyfunctional compound(s) useful in Technique No. 2 ranges from about 5 to about 30%, expressed as weight percent of the core polymer, preferably about 10 to about 20%. Monofunctional monomers may also be added with the polyfunctional compound up to a level of about 70% by weight of the total monomers and polyfunctional compounds added to the preformed core emulsion.

Technique No. 3 involves firstly emulsion polymerization of the shell polymer in the presence of the polyfunctional compound(s), followed by emulsion polymerization of the core polymer and grafting of the core to the shell. This technique differs from Technique No.'s 1 and 2 in that the shell polymer is polymerized first and the graft site is incorporated into the shell polymer. Because of the hydrophylic nature of the shell polymer, it migrates to the particle surface to be at the hydrophylic polymer/water interface. Thus, Technique No. 3 also produces polymers having an alkali-insoluble core and an alkali-soluble shell.

Suitable monomers and concentrations thereof for the shell polymer and core polymer following Technique No. 3 are the same as described for Technique No. 1 above. Likewise, suitable polyfunctional compounds are the same as described for Technique No. 1.

Preferred polyfunctional compounds for use in Technique No. 3 include methallyl-, crotyl- and vinyl-esters of acrylic acid, methacrylic acid, maleic acid (mono- and di-esters), fumaric acid (mono- and di-esters) and itaconic acid (mono- and di-esters); allyl-, methallyl- and crotyl-vinyl ether; N- or N,N di-, methallyl-, crotyl- and vinyl-amides of acrylic acid and methacrylic acid; N-methallyl and crotyl-maleimide; cycloalkenyl esters of acrylic acid, methacrylic acid, maleic acid (mono- and di-esters), fumaric acid (mono- and di-esters, fumaric acid (mono- and di-esters), itaconic acid (mono- and di-esters); 1,3-butadiene; isoprene; para-methylstyrene; chloromethylstyrene; methallyl-, crotyl- and vinyl-mercaptan; and bromotrichloromethane.

The most preferred polyfunctional compounds for use in Technique No. 3 include crotyl esters of acrylic and methacrylic acid, para-methylstyrene, crotyl mercaptan and bromotrichloromethane.

Following Technique 3, the polyfunctional compound(s) is used at a level of about 2 to about 30% by weight of the shell polymer, preferably about 3 to about 10%.

The grafted core-shell polymers of this invention are useful in a variety of applications. The resultant compositions are useful as a clear overprint varnish. Other uses include letdown vehicles for flexographic inks, partial or sole vehicles for gravure and general-purpose inks, coatings for leather embossing, vehicles for floor polishes, additives for cement, and as a seed for further emulsion polymerization.

The core-shell polymers are particularly useful as dry modifiers for cement mortars. The polymers are easily isolatable by conventional methods, such as spray drying, to yield dry free flowing powders, which upon admixture with cement mortars provide superior performance characteristics.

In ink applications, the neutralized core-shell polymers are useful as a letdown vehicle. The polymers are beneficial for rheology, drink (ability to be diluted without loss of viscosity) and stability (especially stability toward alcohols) for a wide variety of inks, particularly aqueous flexographic printing inks. The preferred core-shell polymers for use in flexographic inks are those containing a polystyrene core.

The core-shell polymers of this invention can be formulated and applied to leather or leather substitutes by spray or roll coating to serve as an embossing release coat or a final topcoat or finish. The unique compositional features of the core-shell polymers produce films that possess a high temperature modulus needed for the embossing process. The core-shell polymers can be blended with other multistage acrylic emulsions to obtain desirable properties such as improved flex and adhesion without loss of embossing properties.

In order to further illustrate the invention the following examples, in which all parts and percentages are by weight unless otherwise indicated, are presented. However it should be understood that the invention is not limited to these illustrative examples.

The examples demonstrate that the grafted core-shell polymers of this inventions have greater alcohol stability than polymers of the prior art. The degree of alcohol stability that results depends on (1) the specific composition of the core-shell polymer, (2) the solids content of the polymer emulsion, (3) the type and level of polyfunctional compound used, and (4) the synthesis technique used (i.e. Technique No.'s 1, 2 or 3). As used in the examples, enchanced alcohol stability means no coagulum formed when mixing the polymer composition with isopropyl alcohol, and excellent alcohol stability means in addition that there is no significant increase in viscosity and particle size after heat aging with isopropyl alcohol for 10 days at 60° C.

EXAMPLE 1

Preparation of Core-Shell Polymer with Polyfunctional Monomer in the Core

A stirred reactor containing 1020 grams (g) deionized (D.I.) water, 1.69 g sodium lauryl sulfate and 0.9 g of dibasic ammonium phosphate was heated to 81° C. under nitrogen. Next 40 g of monomer emulsion (M.E.) #1 listed in Table 1 below was added to the reactor, followed by 1.1 g of ammonium persulfate in 28 g of D.I. water. After 17 minutes, the remainder of M.E. #1 was added slowly to the reactor over a 72 minute period, along with Cofeed #1 listed in Table 1, while maintaining a reactor temperature of about 81° C. After a 20-minute hold (at 81° C.), a solution of 1.1 g ammonium persulfate in 55 g of D.I. water was added to the reactor over a 10-minute period. Next, monomer emulsion #2 (listed in Table 1) was added slowly to the reactor over a 108-minute period while Cofeed #2 (listed in Table 1) was added over 138 minutes. A reaction temperature of 81° C. was maintained throughout these additions.

The dispersion was neutralized by adding a solution of 24.4 g dibasic ammonium phosphate in 632 g of D.I. water to reactor over a 10-minute period. This was followed by the addition of a solution of 193 g of 28% aqueous ammonia in 200 g of D.I. water.

The final product had a solids content of 30%, viscosity of 980 cps and pH of 8.5. When 80 g of this composition was mixed with 20 g of isopropyl alcohol (IPA), the viscosity decreased and no coagulum formed. On aging for 10 days at 60° C. the viscosity did not increase, indicating the composition had excellent stability to IPA.

TABLE 1

| (All quantities in gram) | | |
|---|---|---|
| | M.E. #1 (core) | M.E. #2 (shell) |
| D.I. water | 150 | 216 |
| Sodium Lauryl Sulfate | 5.40 | 3.30 |
| Butyl Acrylate (BA) | 292.5 | — |
| Methyl Methacrylate (MMA) | 132.75 | 405 |
| Methacrylic Acid (MAA) | 2.25 | 270 |
| Allyl Methacrylate (ALMA) | 22.5 | — |
| n-Dodecylmercaptan | — | 40.5 |
| | Cofeed #1 | Cofeed #2 |
| D.I. water | 77.0 | 115.0 |
| Ammonium Persulfate | 0.44 | 1.49 |

EXAMPLES 2-7

Variation in the Level of Polyfunctional Monomer in the Core

Following the process of Example 1, the weight % of allyl methacrylate in the first stage (core) was varied from 0-10%. The amount of monomers in grams in the first stage along with particle size and the stability of the final product toward IPA (as described in Example 1) is given in Table 2.

TABLE 2

| EX-AMPLE | BA | MMA | MAA | ALMA | Initial Viscosity With IPA(cps) | Viscosity with IPA aft. 10 days at 60° C.(cps) | Particle Size Without IPA(nm) | Particle Size With IPA(nm) | Particle Size with IPA aft. 10 days at 60° C.(nm) |
|---|---|---|---|---|---|---|---|---|---|
| 2 | 292.5 | 155.25 | 2.25 | — | * | — | 144 | * | * |
| 3 | 292.5 | 150.75 | 2.25 | 4.5 | 72 | 1230 | 191 | >3000 | >3000 |
| 4 | 292.5 | 146.25 | 2.25 | 9.0 | 80 | 84 | 213 | 247 | 558 |
| 5 | 292.5 | 141.75 | 2.25 | 13.5 | 80 | 79 | 218 | 226 | 222 |
| 6 | 292.5 | 137.2 | 2.25 | 18.0 | 82 | 82 | 225 | 238 | 233 |
| 7 | 292.5 | 99.00 | 13.5 | 45 | 82 | 78 | 226 | 229 | 220 |

* coagulated upon addition of IPA

EXAMPLES 8-13

Following the process of Example 1, core-shell polymers were prepared using 2-ethylhexyl acrylate (2-EHA) in the core in place of butyl acrylate. The amount of monomers (in grams) in the core and the stability of the final product towards IPA are given in the Table 3. Monomer Emulsion #2 for the second stage shell polymer contained 438.75 grams MMA and 236.25 grams MAA along with the remaining ingredients given in Table 1. In Examples 8-13, 169 grams of the 28% aqueous ammonia solution was used in the neutralization step and the final product had a solids content of 27%. All other conditions were the same as in Example 1.

Although Example 8, containing no polyfunctional monomer, did not thicken on heat aging, the particle size of the dispersion increased to an unacceptable level and film properties were inferior to the examples containing the polyfunctional monomer.

EXAMPLE 14

Following the process of Example 1, core-shell polymers were prepared using the monomer emulsions, M.E. #1 and M.E. #2, given in Table 4 below. The resulting composition had a solids content of 30%, pH of 8.7 and vicosity of 2700 cps. 80 grams of the polymer composition were diluted with 20 grams of IPA. The polymer composition with IPA had an initial viscosity of 67 cps. After heat-aging for 10 days at 60° C. the viscosity was 102 cps and no coagulum formed.

TABLE 4

| (All quantities in grams) | | |
|---|---|---|
| | M.E. #1 (core) | M.E. #2 (shell) |
| D.I. water | 150 | 216 |
| Sodium Lauryl Sulfate | 5.40 | 3.30 |
| Styrene | 425.25 | — |
| Allyl Methacrylate | 22.5 | — |
| Methacrylic Acid | 2.25 | 235.25 |
| n-Dodecylmercaptan | — | 40.5 |
| Methyl Methacrylate | — | 438.75 |

EXAMPLE 15

Use of Allyl Acrylate as the Polyfunctional Monomer in the Core

A stirred reactor containing 805 g of D.I. water, 2.05 g sodium lauryl sulfate and 1.37 g of dibasic ammonium phosphate was heated to 81° C. under nitrogen. Next, 45 g of monomer emulsion (M.E.) #1 listed in Table 5 below was added to the reactor, followed by 1.37 g of ammonium persulfate in 34 g of D.I. water. After 17 minutes, the remainder of M.E. #1 was added slowly to the reactor over a 60-minute period, along with Cofeed #1 listed in Table 5. A reactor temperature of about 81° C. was maintained during this time and for 30 minutes following the additions. Ten minutes before the start of the stage two polymerization, 1.37 g of ammonia persulfate in 68 g of D.I. water was added dropwise to the reaction. M.E. #2 (listed in Table 5) was added slowly to the reactor over a 90-minute period, beginning 30 minutes after the addition of M.E. #1 was complete. Cofeed #2 (listed in Table 5) was added simultaneously with M.E. #2 at a rate such that the addition was com-

TABLE 3

| EXAMPLE | 2-EHA | MAA | ALMA | Initial Viscosity With IPA(cps) | Viscosity with IPA aft. 10 days at 60° C.(cps) | Particle Size Without IPA(nm) | Particle Size With IPA(nm) | Particle Size with IPA aft. 10 days at 60° C.(nm) |
|---|---|---|---|---|---|---|---|---|
| 8 | 447.75 | 2.25 | — | 74 | 60 | 173 | 277 | 529 |
| 9 | 443.25 | 2.25 | 4.5 | 76 | 80 | 210 | 230 | 394 |
| 10 | 438.75 | 2.25 | 9.0 | 78 | 60 | 250 | 241 | 216 |
| 11 | 434.25 | 2.25 | 13.5 | 74 | 60 | 236 | 216 | 205 |
| 12 | 429.75 | 2.25 | 18.0 | 80 | 66 | 273 | 272 | 193 |
| 13 | 425.25 | 2.25 | 22.5 | 80 | 64 | 249 | 245 | 253 | plete 30 minutes after the addition of M.E. #2 was complete.

The polymer composition was buffered by the dropwise addition of a solution of 29.33 g dibasic ammonia phosphate in 400 g of D.I. water. The final product had a solids content of 40%, pH of 5.35 and viscosity of 13 cps (unneutralized). After neutralization to pH 8.0-9.0 with ammonia, the polymer composition showed excellent stability to alcohol as described in Example 1.

TABLE 5

| (All quantities in grams) | | |
|---|---|---|
| | M.E. #1 (core) | M.E. #2 (shell) |
| D.I. Water | 227.5 | 227.5 |
| Sodium Lauryl Sulfate | 8.14 | 3.41 |
| Butyl Acrylate | 440.5 | — |
| Methyl Methacrylate | 225.22 | 443.7 |
| Methacrylic Acid | 3.41 | 238.9 |
| Allyl Acrylate | 13.1 | — |
| n-Dodecylmercaptan | — | 40.96 |
| | Cofeed #1 | Cofeed #2 |
| D.I. Water | 95 | 142 |
| Ammonium Persulfate | 0.68 | 1.71 |

EXAMPLE 16

Use of Diallyl Maleate as the Polyfunctional Monomer in the Core

Following the procedure of Example 5, except that allyl methacrylate was replaced with diallyl maleate, core-shell polymers according to this invention were prepared. The compositions were tested for stability toward isopropyl alcohol as described in Example 1 and exhibited enhanced stability to isopropyl alcohol.

EXAMPLE 17

Polyfunctional Monomer Added Late in the Core Preparation

Core-shell polymers were prepared as in Example 1, except the M.E. #1 was replaced with that shown in Table 6. Also, 13.5 g of allyl methacrylate was added and stirred into M.E. #1 after one-half of M.E. #1 had been added to the reaction. This resulted in an allyl methacrylate-rich phase being polymerized onto the allyl methacrylate-free initial stage core particles. When tested for alcohol stability (as described in Example 1), the viscosity rose from 146 cps to 345 cps and no coagulum formed, indicating that the polymer composition had enhanced stability to alcohol.

TABLE 6

| (all quantities in grams) | |
|---|---|
| | M.E. #1 (core) |
| D.I. Water | 150 |
| Sodium Lauryl Sulfate | 5.40 |
| Butyl Acrylate | 434.25 |
| Methacrylic Acid | 2.25 |

EXAMPLE 18

Addition of Polyfunctional Monomer After Polymerization of the Core

A latex core prepared as described in Example 1 using the monomer emulsion (M.E.) #1 described in Table 7. Next, the reactor was cooled to 60° C. and 56.25 g of 1,3-butylene dimethacrylate added. After stirring for about 15 minutes, solutions of 1.0 g t-butyl hydroperoxide in 10 g D.I. water, 0.5 g sodium sulfoxylate formaldehyde in 20 g D.I. water and 5 g of 0.15% ferrous sulfate heptahydrate were added to the reactor. The temperature rose from 54° C. to 57° C. The reactor was heated to 81° C., and after 30 minutes, a solution of 1.1 g of ammonia persulfate in 55 g of D.I. water was added to the reactor over a 10-minute period. Next, M.E. #2 (listed in Table 7) was added slowly to the reactor over a 98-minute period while Cofeed #2 (listed in Table 7) was added over 128 minutes. A reaction temperature of about 81° C. was maintained throughout these additions. The resin was neutralized as described in Example 1.

The product had a solids content of 29%, pH of 8.97, and viscosity of 680 cps. The viscosity of the polymer composition increased in the alcohol stability test (as described in Example 1), but it exhibited enhanced stability to alcohol.

TABLE 7

| (All quantities in grams) | | |
|---|---|---|
| | M.E. #1 (core) | M.E. #2 (shell) |
| D.I. Water | 150 | 198 |
| Sodium Lauryl Sulfate | 5.4 | 3.0 |
| Butyl Acrylate | 292.5 | — |
| Methyl Methacrylate | 155.25 | 371.25 |
| Methacrylic Acid | 2.25 | 247.5 |
| n-Dodecylmercaptan | — | 37.1 |
| | | Cofeed #2 |
| D.I. Water | | 115 |
| Ammonium Persulfate | | 1.49 |

EXAMPLES 19-21

Following the procedure of Example 18, additional core-shell polymers were prepared. In Example 19, 447.75 grams of 2-ethylhexyl acrylate were used in M.E. #1 in place of the butyl acrylate and methyl methacrylate, and 402.2 g of methyl methacrylate and 216.6 g of methacrylic acid were used in M.E. #2. Example 20 was prepared similarily to Example 19, except that the 1,3-butylene dimethacrylate was replaced with allyl methacrylate. Example 21 was prepared similarly to Example 19, except that the 1,3-butylene dimethacrylate was replaced with a 2:1 blend of 2-ethylhexyl acrylate and allyl methacrylate. In all examples the polymer compositions showed enhanced stability toward isopropyl alcohol as described in Example 1.

EXAMPLE 22

Use of Dual Chain Transfer Agents in the Shell

A stirred reactor containing 902 g of D.I. water, 2.4 g sodium lauryl sulfate and 4.0 g sodium acetate trihydrate was heated to 81° C. under nitrogen. Next, 50 g of M.E. #1 (given in Table 8 below) was added to the reactor, followed by 1.6 g of ammonium persulfate in 40 g of D.I. water. After 17 minutes, the remainder of M.E. #1 was added to the reactor over a 90-minute, along with Cofeed #1 (listed in Table 8) while maintaining a reactor temperature of about 81° C. After a 20-minute hold (at 81° C.), a solution of 1.6 g ammonium persulfate in 80 g of D.I. water was added to the reactor over a 10-minute period. Next, M.E. #2 (listed in Table 8) was added slowly to the reactor over a 90-minute period while Cofeed #2 (listed in Table 8) was added over 120 minutes. A reaction temperature of about 81° C. was maintained throughout these additions. Any residual mercaptan was oxidized with 40 g of 10% aqueous hydrogen peroxide.

The final product had a solids content of 45%, pH of 3.50 and viscosity of 30 cps (unneutralized). It was neutralized to a pH of 8.0–9.0 with aqueous ammonia. The composition showed enhanced alcohol stability as described in Example 1.

TABLE 8

| (All quantities in grams) | | |
|---|---|---|
| | M.E. #1 (core) | M.E. #2 (shell) |
| D.I. Water | 265 | 265 |
| Sodium Lauryl Sulfate | 9.6 | 4.0 |
| Butyl Acrylate | 516 | — |
| Methyl Methacrylate | 264 | 640 |
| Methacrylic Acid | 4 | 160 |
| Allyl Methacrylate | 16 | — |
| n-Dodecylmercaptan | — | 24 |
| methyl-3-mercaptopropionate | — | 12 |
| | Cofeed #1 | Cofeed #2 |
| D.I. Water | 110 | 160 |
| Ammonium Persulfate | 0.8 | 2.0 |

EXAMPLE 23

Sequential Addition of Dual Chain Transfer Agents to The Shell

Core-shell polymers were prepared as in Example 22, except that Monomer Emulsion #2 was split into two emulsions (M.E. #2A and M.E. #2B) as listed in Table 9 below. M.E. #2A was added first over an 18-minute period during preparation of the shell polymer. M.E. #2B was subsequently added over a 72-minute period. All other aspects of the synthesis were the same as given in Example 22.

After neutralization with aqueous ammonia, the polymer composition showed excellent alcohol stability as described in Example 1.

TABLE 9

| (All quantities in grams) | | |
|---|---|---|
| | M.E. #2A | M.E. #2B |
| D.I. water | 53 | 212 |
| Sodium Lauryl Sulfate | 0.8 | 3.2 |
| Methyl Methacrylate | 128 | 512 |
| Methacrylic Acid | 32 | 128 |
| n-Dodecylmercaptan | 9.6 | — |
| methyl-3-mercaptopropionate | — | 19.2 |

EXAMPLE 24

Use of Butyl-3-Mercaptopropionate as the Chain Transfer Agent in the Shell

A stirred reactor containing 1000 g D.I. water and 6.2 g of 28% sodium lauryl sulfate was heated to 82° C. Next, 35 g of monomer emulsion (M.E.) #1 listed in Table 10 was added to the reactor, followed by 1.2 g of ammonium persulfate in 45 g of D.I. water. After about 15 minutes, the remainder of M.E. #1 was added slowly to the reactor over a 72-minute period, along with Cofeed #1 listed in Table 10, while maintaining a reactor temperature of about 81° C. After a 20-minute hold (at 81° C.) a solution of 1.7 g ammonium persulfate and 6.0 g Aerosol A-103 (34%) in 125 g of D.I. water was added to the reactor over a 10-minute period. Next, M.E. #2 (listed in Table 10) was added slowly to the reactor over a 108-minute period while Cofeed #2 (listed in Table 10) was added over 138 minutes. A reaction temperature of about 81° C. was maintained through these additions.

The dispersion was buffered to a pH of 5.5–6.0 with 50.4 g of dibasic ammonium phosphate dissolved in 180 g of D.I. water and then neutralized to a pH of 8–9 with 28% aqueous ammonia. Any residual mercaptan was oxidized with 20 g of 10% aqueous hydrogen peroxide. The final product had a solids content of 38%, a pH of 9.0, and viscosity of 327 cps. The polymer composition had excellent alcohol stability as described in Example 1.

TABLE 10

| (All quantities in grams) | | |
|---|---|---|
| | M.E. #1 (core) | M.E. #2 (shell) |
| D.I. Water | 150 | 350 |
| Sodium Lauryl Sulfate (28%) | 32.9 | 7.7 |
| *Aerosol A-103 (34%) | — | 25.4 |
| Butyl Acrylate | 366 | — |
| Styrene | 115 | — |
| Methyl Methacrylate | 54.7 | 536 |
| Allyl Methacrylate | 17.3 | — |
| Methacrylic Acid | 23 | 328 |
| Butyl-3-mercaptopropionate | — | 47.5 |
| | Cofeed #1 | Cofeed #2 |
| D.I. water | 100 | 125 |
| Ammonium persulfate | 0.58 | 1.7 |
| t-Butylhydroperoxide (70%) | — | 7.0 |

*(disodium ethoxylated nonylphenol half-ester of sulfosuccinic acid)

EXAMPLE 25

Core Shell Polymer Prepared by First Polymerization of Shell in Presence of Polyfunctional Monomer A stirred reactor containing 478 g of D.I. water, 4.5 g of sodium acetate trihydrate and 9.8 g of 23% sodium dodecylbenzensulfonate was heated to 81° C. under nitrogen. Then, 32 g of monomer emulsion (M.E.) #1 listed in Table 11 was added to the reactor, followed by 0.68 g ammonium persulfate i 25 g of D.I. water. After 13 minutes, the remainder of M.E. #1 was added slowly to the reactor over a 60-minute period, along with Cofeed #1 listed in Table 11, while maintaining a reactor temperature of about 81° C. After a 30-minute hold at 81° C., M.E. #2 (listed in Table 11) was added slowly to the reactor over a 60-minute period along with Cofeed #2 (listed in Table 11) The reaction was held at 81° C. for 30 minutes, and then cooled to 55° C.

The final product had a solids content of 41.4%, pH of 4.78 and viscosity of 22 cps (unneutralized). After neutralization the polymer composition showed excellent alcohol stability as described in Example 1.

TABLE 11

| (All quantities in grams) | | |
|---|---|---|
| | M.E. #1 (shell) | M.E. #2 (core) |
| D.I. Water | 150 | 165 |
| Sodium dodecylbenzene-sulfonate (23%) | 9.8 | 9.8 |
| Aerosol A-103 (33.2%) | 6.8 | — |
| Methyl Methacrylate | 315 | 157.5 |
| Methacrylic Acid | 90 | — |
| Crotyl Methacrylate | 45 | — |
| Butyl Acrylate | — | 292.5 |
| n-Dodecylmercaptan | 27 | 2.25 |
| | Cofeed #1 | Cofeed #2 |
| D.I. Water | 50 | 62.5 |
| Ammonium Persulfate | 1.58 | 0.9 |

EXAMPLE 26

Following the procedures of Example 25, core-shell polymers were prepared using the monomer emulsions listed in Table 12 below. After neutrlization to pH 8.0–9.0, the polymer composition exhibited excellent alcohol stability as described in Example 1.

TABLE 12

|  | M.E. #1 (shell) | M.E. #2 (core) |
|---|---|---|
| D.I. Water | 150 | 165 |
| Sodium Dodecylbenzene-sulfonate (23%) | 9.8 | 9.8 |
| Aerosol A-103 (33.2%) | 6.8 | — |
| Methyl Methacrylate | 315 | 155.25 |
| para-Methylstyrene | 90 | 2.25 |
| Butyl Acrylate | — | 292.5 |
| Butyl-3-mercaptopropionate | 21.6 | 2.25 |

EXAMPLE 27

Core-Shell Polymer with High Core:Shell Ratio

A stirred reactor containing 1102 g of D.I. water heated to 81° C. under nitrogen. Next 40 g of monomer emulsion (M.E.) #1 listed in Table 13 was added to the reactor over a 135-minute period period, along with Cofeed #1 listed in Table 13, while maintaining a reactor temperature of about 81° C. After 30-minute hold (at 81° C.), M.E. #2 (listed in Table 13) was added slowly to the reactor over a 45-minute period while Cofeed #2 (listed in Table 13) was added over 75 minutes. A reaction temperature of about 81° C. was maintained through these additions.

After neutralization to pH 8.0–9.0 the composition show excellent alcohol stability. The composition also had enhanced stability to butyl cellosolve.

TABLE 13

| (All quantities in grams) | | |
|---|---|---|
|  | M.E. #1 (core) | M.E. #2 (shell) |
| D.I. Water | 405 | 75 |
| Sodium Lauryl Sulfate | 12.37 | 2.07 |
| Methyl Methacrylate | 761 | 330 |
| 2-Ethylhexyl Acrylate | 433 | — |
| Allyl Methacrylate | 37 | — |
| Methacrylic Acid | 6.2 | 82.5 |
| n-Octyl Mercaptan | — | 12.4 |
|  | Cofeed #1 | Cofeed #2 |
| D.I. Water | 240 | 135 |
| Ammonium Persulfate | 2.92 | 1.65 |

EXAMPLE 28

Use of 1,3-Butadiene as the Polyfunctional Monomer in the Core

A latex having a composition of 69.47 parts by weight (pbw) butadiene, 28.31 pbw styrene and 2.22 pbw methyl methacrylate was prepared as described in U.S. Pat. No. 4,443,585. The latex had a solids content of 34% and a particle size of approximately 80 nanometers.

A stirred reactor containing 400 g D.I. water and 1739 g of the latex described above was heated to 85° C. under nitrogen. A solution of 1.2 g of ammonium persulfate and 4.4 g Aerosol A-103 (33%) in 60 g of D.I. water was added to the reactor. The monomer emulsion (M.E.) described in Table 14 was added slowly to the reactor over a 90-minute period. A solution of 1.8 g of ammonium persulfate in 150 g D.I. water was added simultaneously with the M.E. at such a rate so that its addition was complete 30 minutes after the M.E. addition was complete. A reactor temperature of about 85° C. was maintained during these additions. The reaction was cooled to 55° C.

The polymer was buffered by the dropwise addition of a solution of 6.7 g dibasic ammonium phosphate in 20 g of D.I. water and neutralized with 114 g of 28% aqueous ammonia. The product had a solids content of 38%, a pH of 9.1 and viscosity of 3400 cps. The polymer composition showed excellent stability to alcohol as described in Example 1.

TABLE 14

| (All quantities in grams) | |
|---|---|
|  | M.E. (shell) |
| D.I. Water | 290 |
| Sodium Lauryl Sulfate (28%) | 15.8 |
| Aerosol A-103 (33%) | 13.2 |
| Methacrylic Acid | 146.7 |
| Methyl Methacrylate | 586.6 |
| Methyl-3-mercaptopropionate | 24 |

EXAMPLE 29

50:50 Core-Shell Polymers with Polyfunctional Monomer in the Core

Following the procedures of Example 22, except that the n-dodecylmercaptan and methyl-3-mercaptopropionate were replaced with 48 grams n-dodecylmercaptan, core-shell polymers were prepared for comparison to the comparative Examples 30 and 31 which follow. The core-shell polymer consisted of 50% core polymer having a composition of 64.5 pbw butyl acrylate, 33 pbw methyl methacrylate, 2 pbw allyl methacrylate and 0.5 pbw methacrylic acid and 50% shell polymer having a composition of 80 pbw methyl methacrylate and 20 pbw methacrylic acid. The final unneutralized polymer composition had a solids content of 45%, pH of 4.1, and viscosity of 45 cps. The particle size of the core polymer was 96 nanometers. After polymerizing the shell, a particle size of 122 nanometers resulted. After neutralization, the polymer composition showed excellent alcohol stability as described in Example 1.

EXAMPLE 30

Polyfunctional Monomer and Chain Transfer Agent in the Core

A stirred reactor containing 1102 g of D.I. water, 4.95 g sodium lauryl sulfate and 4.12 g of sodium acetate trihydrate was heated to 81° C. under nitrogen. Next 40 g of M.E. #1 listed in Table 15 was added to the reactor, followed by 1.65 g ammonium persulfate in 42 g of D.I. water. After 17 minutes, the remainder of M.E. #1 was added slowly to the reactor over a 135-minute period, along with Cofeed #1 listed in Table 15, while maintaining a reactor temperature of about 81° C. After a 30-minute hold (at 81° C.), M.E. #2 (listed in Table 15) was added slowly to the reactor over a 45-minute period while Cofeed #2 (listed in Table 15) was added over 75 minutes. A reaction temperature of about 81° C. was maintained throughout these additions.

On neutralization to pH 8.0–9.0, a resin having excellent alcohol stability resulted. This resin was also shown to be stable to the addition of common coalescents, such as butyl cellosolve.

TABLE 15

(All quantities in grams)

|  | M.E. #1 (core) | M.E. #2 (shell) |
|---|---|---|
| D.I. Water | 405 | 75 |
| Sodium Lauryl Sulfate | 12.37 | 2.07 |
| iso-Butyl Metacrylate | 804 | 330 |
| Methyl Methacrylate | 427 | — |
| Methacrylic Acid | 6.2 | — |
| Allyl Methacrylate | 37.1 | 82.5 |
| n-Dodecylmercaptan | 61.8 | — |
| n-octyl mercaptan | — | 12.4 |

|  | Cofeed #1 | Cofeed #2 |
|---|---|---|
| D.I. Water | 240 | 135 |
| Ammonium Persulfate | 2.92 | 1.65 |

EXAMPLE 31

50:50 Core-Shell Polymers Without Polyfunctional Monomer in the Core (Comparative)

Following the procedures of Example 29, except using monomer emulsion (M.E.) #1 given in Table 16, core-shell polymers falling outside the scope of this invention were prepared. After neutralization, the polymer composition was not alcohol stable in the test described in Example 1. After being mixed with isopropyl alcohol, the polymer composition coagulated to form large solid chunks of polymer.

TABLE 16

(All quantities in grams)

|  | M.E. #1 |
|---|---|
| D.I. Water | 265 |
| Sodium Lauryl Sulfate | 9.6 |
| Butyl Acrylate | 516 |
| Methyl Methacrylate | 280 |
| Methacrylic Acid | 4 |

EXAMPLE 32

Blend of Alklai-Insoluble Resin/Alkali-Soluble Resin without Polyfunctional Monomer (Comparative)

Following the procedures of Example 31, alkali-insoluble core polymer was prepared. Additionally, an alkali-soluble resin was prepared as taught in pending U.S. patent application Ser. No. 872,714 (Albert B. Brown, et al.) having the composition of 80 pbw methyl methacrylate, 20 pbw methacrylic acid and 6 pbw n-dodecylmercaptan. The alkali-insoluble and alkali-soluble resins were blended at a 50:50 weight ratio. This blend was diluted with deionized water to a 35% solids content and neutralized with aqueous ammonia to pH 8.0-9.0. This blend was tested for alcohol stability as described in Example 1 and coagulated upon mixing with isopropyl alcohol.

EXAMPLE 33

Blend of Alkali-Insoluble Resin/Alkali-Soluble Resin with Polyfunctional Monomer (Comparative)

Following the procedures of Example 1, an alkali-insoluble core polymer was prepared. This core polymer was blended with the alkali-soluble resin prepared in Example 32 above in the same manner as in Example 32. This blend was tested for alcohol stability as described in Example 1 and coagulated upon mixing with isopropyl alcohol.

I claim:

1. A composition comprising a core-shell polymer having an alkali-insoluble polymer core and a alkali-soluble polymer shell, wherein said core and said shell have been substantially chemically grafted together, said shell and said core being prepared sequentially be emulsion polymerization, and said shell is polymerized from a mixture of monomers comprising about 10 to about 60% by weight acid-containing or anhydride-containing unsaturated monomer wherein the ratio of said core to said shell is about 85:15 to about 15:85, said core having a weight average molecular weight of greater than about 8,000 and said shell having a weight average molecular weight of about 5,000 to about 100,000 as determined by gel permeation chromatography.

2. A composition of claim 1 wherein said core and said shell are polymerized from monomers selected from methyl acrylate, ethyl acrylate, butyl acrylate, 2-ethylhexyl acrylate, decyl acrylate, methyl methacrylate, ethyl methacrylate, hydroxyethyl methacrylate, butyl methacrylate, acrylonitrile, acrylic acid, methacrylic acid, itaconic acid, maleic acid, fumaric acid, acrylic anhydride, methacrylic anhydride, maleic anhydride, itaconic anhydride, fumaric anhydride, styrene, substituted styrene, vinyl acetate, and other $C_1$ to $C_{12}$ alkyl acrylates and methacrylate.

3. A composition of claim 1 wherein said core is polymerized from a mixture of monomers comprising 0 to about 10% by weight acid-containing unsaturated monomer.

4. A composition of claim 3 wherein said shell is polymerized from a mixture of monomers comprising about 40 to about 90% by weight methyl methacrylate.

5. A composition of claim 1 wherein said shell is polymerized from a mixture of monomers comprising about 20 to about 50% by weight acid-containing or anhydride-containing unsaturated monomer.

6. A composition of claim 1 wherein said core-shell polymer has been neutralized with a base.

7. A composition of claim 6 wherein said base is selected from the group consisting of ammonia, triethylamine, monoethanolamine, dimethylaminoethanol, sodium hydroxide and potassium hydroxide.

8. A composition of claim 1 wherein the glass transition temperature of said core is about $-65°$ C. to about 100 C. and the glass transition temperature of said shell is greater than about 100° C.

9. A composition of claim 1 wherein said core and said shell are chemically grafted together using one or more polyfunctional compounds selected from
   (a) polyfunctional compounds having two or more sites of unsaturation,
   (b) reactive chain transfer agents having two or more abstractable atoms, and
   (c) hydrid polyfunctional compounds having one or more abstractable atoms and one or more sites of unsaturation.

10. A composition of claim 9 wherein said polyfunctional compound is present during the emulsion polymerization of said core, followed by emulsion polymerization and grafting of said shell to said core.

11. A composition of claim 10 wherein said polyfunctional compound has at least two sites of unsaturation of unequal reactivity and is present at a level of from about 0.1 to about 30% by weight of said core.

12. A composition of claim 11 wherein the level of said polyfunctional compound is about 1.0 to about 10% by weight of said core.

13. A composition of claim 10 wherein said polyfunctional compound is selected from the group consisting of allyl-, methallyl-, vinyl-, and crotyl-esters of acrylic, methacrylic, maleic (mono- and di-esters), fumaric (mono- and di-esters) and itaconic (mono- and di-esters) acids; allyl-, methallyl, and crotyl-vinyl ether and thioether; N- and N,N-di-allyl-, methallyl-, crotyl-, and vinyl-amides of acrylic acid and methacrylic acid; N-allyl-, methallyl-, and crotyl-maleimide; vinyl esters of 3-butenoic and 4-pentenoic acids; diallyl phthalate; triallyl cyanurate; O-allyl-, methallyl-, crotyl-, O-alkyl-, aryl-, P-vinyl-, P-allyl-, P-crotyl-, and P-methallyl-phosphonates; triallyl-, trimethallyl-, and tricrotyl-phosphates; O-vinyl-, O,O-diallyl-, dimethallyl-, and dicrotyl-phosphates; cycloalkenyl esters of acrylic, methacrylic, maleic (mono- and di-esters), fumaric (mono- and di-esters), and itaconic (mono- and di-esters) acids; vinyl ethers and thioethers of cycloalkenols and cycloalkene thiols; vinyl esters of cycloalkene carboxylic acids; 1,3-butadiene, isoprene, and other conjugated dienes; para-methyl styrene; chloromethylstyrene; allyl-, methallyl-, vinyl-, and crotyl-mercaptan; bromotrichloromethane; bromoform; carbon tetrachloride; and carbon tetrabromide.

14. A composition of claim 11 wherein the polyunctional compound is allyl acrylate or allyl methacrylate and comprises about 1 to about 10% by weight of said core.

15. A composition of claim 10 wherein said polyfunctional compound is butadiene or isoprene and is present at a level of from about 1.0 to 100% by weight of said core.

16. A composition of claim 9 wherein said polyfunctional compound is added after emulsion polymerization of said core, allowed to soak into said core and polymerized, followed by emulsion polymerization and grafting of said shell to said core, said polyfunctional compound being present at a level of about 5 to about 30% by weight of said core.

17. A composition of claim 16 wherein said polyfunctional compound is selected from the group consisting of allyl-, methallyl-, vinyl-, and crotyl-esters of acrylic, methacrylic, maleic (mono- and di-esters), fumaric (mono- and di-esters) and itaconic (mono- and di-esters) acids; allyl-, methallyl-, and crotyl-vinyl ether and thioether; N- and N,N-di-allyl-, methallyl-, crotyl-, and vinyl-amides of acrylic acid and methacrylic acid; N-allyl, methallyl-, and crotyl-maleimide; vinyl esters of 3-butenoic and 4-pentenoic acids; diallyl phthalate; triallyl cyanurate; O-allyl-, methallyl-, crotyl-, O-alkyl, aryl-, P-vinyl-, P-allyl-, P-crotyl-, and P-methallyl-phosphonates; triallyl-, trimethallyl-, and tricrotyl-phosphates; O-vinyl-, O,O-diallyl-, dimethallyl-, and dicrotyl-phosphates; cycloalkenyl esters of acrylic, methacrylic, maleic (mon- and di-esters), fumaric (mono- and di-esters), and itaconic (mono- and di-esters) acids; vinyl ethers and thioethers of cycloalkenols and cycloalkene thiols; vinyl esters of cycloalkene carboxylic acids; 1,3-butadiene, isoprene and the other conjugated dienes; ethyleneglycol dimethacrylate, diethyleneglycol dimethacrylate, triethyleneglycol dimethacrylate, polyethylene glycol dimethacrylate, polypropyleneglycol dimetharylate, neopentylglycol dimethacrylate, 1,3-butyleneglycol diacrylate, neopentylglycol diacrylate, trimethylolethane trimethacrylate, dipentaerythritol triacrylate, dipentaerythritol tetraacrylate, dipentaerythritol pentaacrylate, 1,3-butylene glycol dimethacrylate, trimethylolpropane triemthacrylate, trimethylol propane triacrylate, tripropylene glycol diacrylate, and divinyl benzene.

18. A composition of claim 16 wherein the level of said polyfunctional compound is about 10 to about 20% by weight of said core.

19. A composition of claim 9 wherein said polyfunctional compound is present during the emulsion polymerization of said shell, followed by emulsion polymerization and grafting of said core to said shell, said polyfunctional compound being present at a level of from about 2 to about 30% by weight of said shell.

20. A composition of claim 19 wherein said polyfunctional compound is present at a level of from about 3 to about 10% by weight of said shell.

21. A composition of claim 19 wherein said polyfunctional compound is selected from the group consisting of allyl-, methallyl-, vinyl-, and crotyl-esters of acrylic, methacrylic, maleic (mono- and di-esters), fumaric (mono- and di-esters) and itaconic (mono- and di-esters) acids; allyl-, methallyl-, and crotyl-vinyl ether and thioether; N- and N,N-di-allyl-, methallyl-, crotyl-, and vinyl-amides of acrylic acid and methacrylic acid; N-allyl-, methallyl-, and crotyl-maleimide; vinyl esters of 3-butenoic and 4-pentenoic acids; diallyl phthalate; triallyl cyanurate; O-allyl-, methallyl-, crotyl-O-alkyl-, aryl-, P-vinyl-, P-allyl-, P-crotyl-, and P-methallyl-phosphonates; triallyl-, trimethallyl-, and tricrotyl-phosphates; O-vinyl-, O,O-diallyl-, dimethallyl-, and dicrotyl-phosphates; cycloalkenyl esters of acrylic, methacrylic, maleic (mono- and di-esters), fumaric (mono- and di-esters), and itaconic (mono- and di-esters) acids; vinyl ethers and thioethers of cycloalkenols and cyclaolkene thiols; vinyl esters of cycloalkene carboxylic acids; 1,3-butadiene, isoprene and other conjugated dienes; para-methylstyrene; styrene; chloromethylstyrene; allyl-, methallyl-, crotyl- and vinyl-mercaptan; and bromotrichloromethane, bromoform, carbon tetrabromide, and carbon tetrachloride.

22. A composition of claim 19 wherein said polyfunctional compound is selected from, methallyl-, crotyl- and vinyl-esters of acrylic acid, methacrylic acid, maleic acid (mono- and di-esters), fumaric acid (mono- and di-esters) and itaconic acid (mono- and di-esters); allyl-, methallyl- and crotyl-vinyl ether; N- or N,N-di-, methallyl-, crotyl- and vinyl-amides of acrylic acid or methacrylic acid; N-methallyl and crotyl maleimide; crycloalkenyl esters of acrylic acid, methacrylic acid, maleic acid (mono- and di-esters), fumaric acid (mono- and di-esters), itaconic acid (mono- and di-esters); 1,3-butadiene; isoprene; paramethylstyrene; chloromethylstyrene; methallyl-, crotyl- and vinyl-mercaptan; and bromotrichloromethane.

23. A composition of claim 19 wherein said polyfunctional compound is selected from crotyl esters of acrylic and methacrylic acids, paramethylstyrene, crotyl mercaptan, and bromotrichloromethane.

* * * * *